W. O. Hickok,

Making Wooden Screws.

N° 21,960.   Patented Nov. 2, 1858.

Witnesses:
Henry Beader
S. Schriver

Inventor:
W O Hickok

UNITED STATES PATENT OFFICE.

W. O. HICKOK, OF HARRISBURG, PENNSYLVANIA.

TAP FOR CUTTING WOODEN SCREWS.

Specification of Letters Patent No. 21,960, dated November 2, 1858.

*To all whom it may concern:*

Be it known that I, W. O. HICKOK, of Harrisburg, in the county of Dauphin and State of Pennsylvania, have invented a new and useful Improvement in Taps for Cutting Screws in Wood; and I do hereby declare that the following is a full, clear, and exact description of the construction and operation of the same, reference being had to the accompanying drawings, making a part of this specification, in which—

Figure 1:
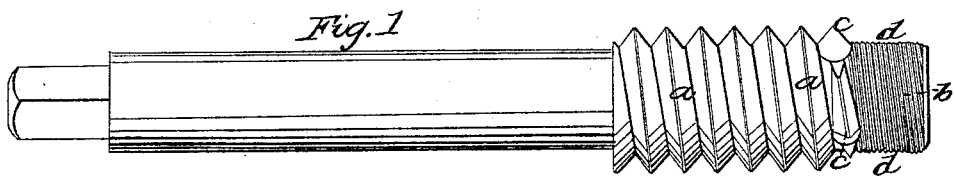
Figure 2:
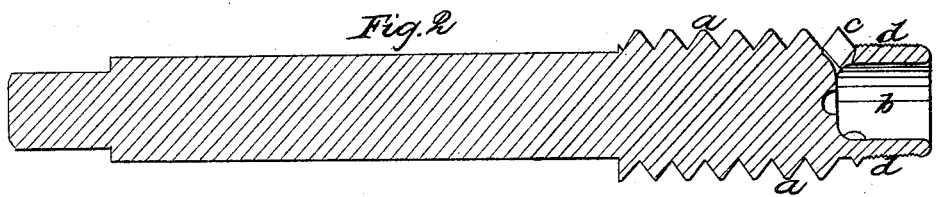
Figure 3:
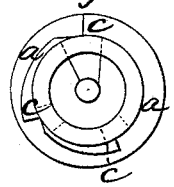

Figure 1, is a side view of one of the said taps with the improvement applied thereto; Fig. 2, a longitudinal section of the same through its center; and Fig. 3, an end view—like letters in the different figures indicating the same parts.

The tap heretofore used for cutting screws in wood is not constructed with any sufficient device for compelling it to enter the hole previously made in the wood in which the required screw is to be cut, at that regular speed, during its rotation, which is required to make its first cut harmonize in pitch with that of the screw on the tap; and consequently a great degree of manual dexterity and skill is required to enter such a tap properly—and even in such hands the first few threads of the screw produced, are generally imperfect and irregular, and therefore often useless. To remedy this deficiency is the object of my inprovement or invention.

It consists in constructing the cylindrical projection at its cutting end of a diameter slightly larger than the diameter of the required hole in the wood in which the screw is to be cut, and making spirally around on its outer side or periphery, a series of minute threads, each of the same pitch as that of the regular usual screw threads of the tap.

In the drawings, $a$—$a$, represent the usual screw threads of the tap; $b$, the cylindrical projection; and $c$, $c$, $c$, the usual cutters in connection with the same.

The cylindrical projection, ($b$), is made tubular, and open at its outer end for the escape of chips. The cutters are made and inserted in the usual manner in line with the thread-throats being also made beneath them through the shell of the cylinder for the passage of the chips. Spirally around on the outer side or periphery of the said cylinder ($b$); a series of minute threads, $d$—$d$, are cut so that they shall have precisely the same pitch as that of the usual larger threads ($a$—$a$) of the tap; the said cylinder being made the depth of the said minute threads ($d$—$d$) larger than the diameter of the hole in the wood in which the screw is to be cut, or—which amounts to the same—larger than the diameter of the tap measuring from the base of its threads.

In the operation of this improved tap it will be readily perceived—the diameter of the hole in the wood in which the screw desired is to be cut, being slightly less than the diameter of the threaded cylinder ($b$), as described—that as the tap is being rotated with the said projection ($b$) in the hole in the wood, the minute threads ($d$—$d$) will become indented into the wood, produce counter-part threads therein, and so compel the tap with its cutters, and thread ($a$) to follow and produce the threads required so that their pitch shall, from the commencement, be in perfect harmony with the pitch of the usual threads ($a$—$a$) of the tap.

I do not claim a hollow cylindrical projection at the cutting end of a tap; nor the throats leading from beneath the cutters into the same; but

What I claim as my invention and desire to secure by Letters Patent, is—

Making screw threads ($d$—$d$) around the outer surface or periphery of the cylindrical projection ($b$) so that they shall operate in the manner and for the purpose described—the said projection ($b$) being made slightly larger than the hole in the wood in which the required screw is to be cut, for the purpose described.

W. O. HICKOK.

Witnesses:
 HENRY BEADER,
 S. SCHRIVER.